G. A. JENNING.
LEVELING INSTRUMENT.
APPLICATION FILED JULY 19, 1911.
1,060,602.
Patented May 6, 1913.
2 SHEETS—SHEET 2.
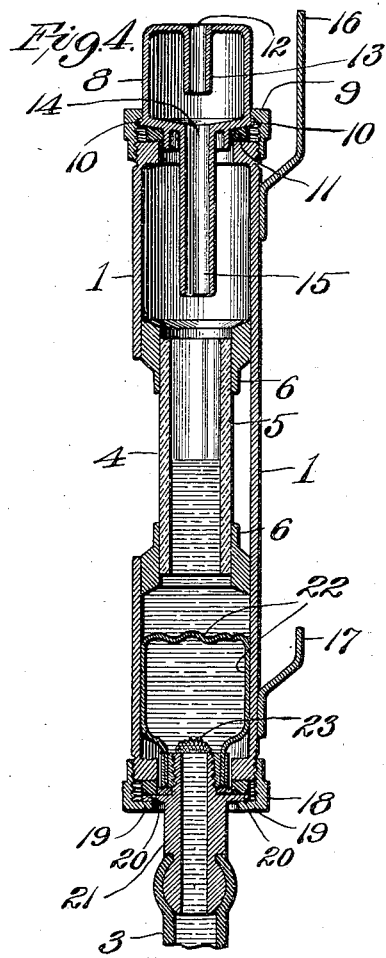
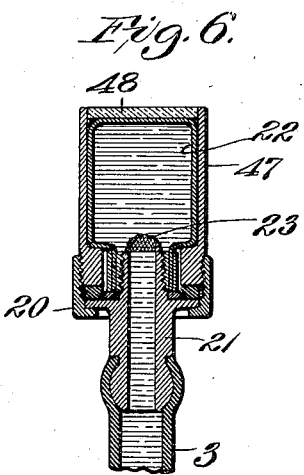
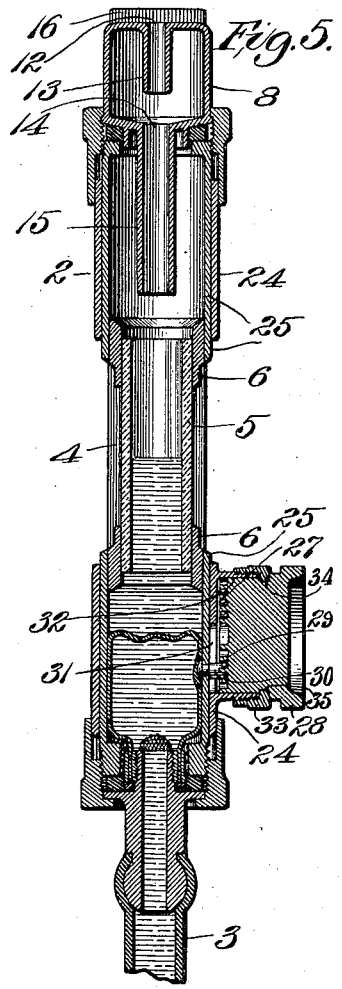
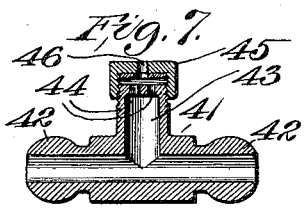
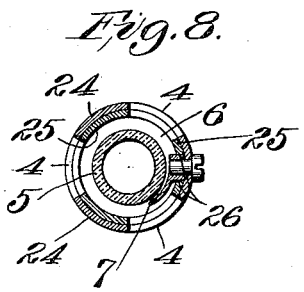
Attest:
W. H. Scott
E. L. Wallace
Inventor:
Gustav A. Jenning,
by Higdon Longan
attys.

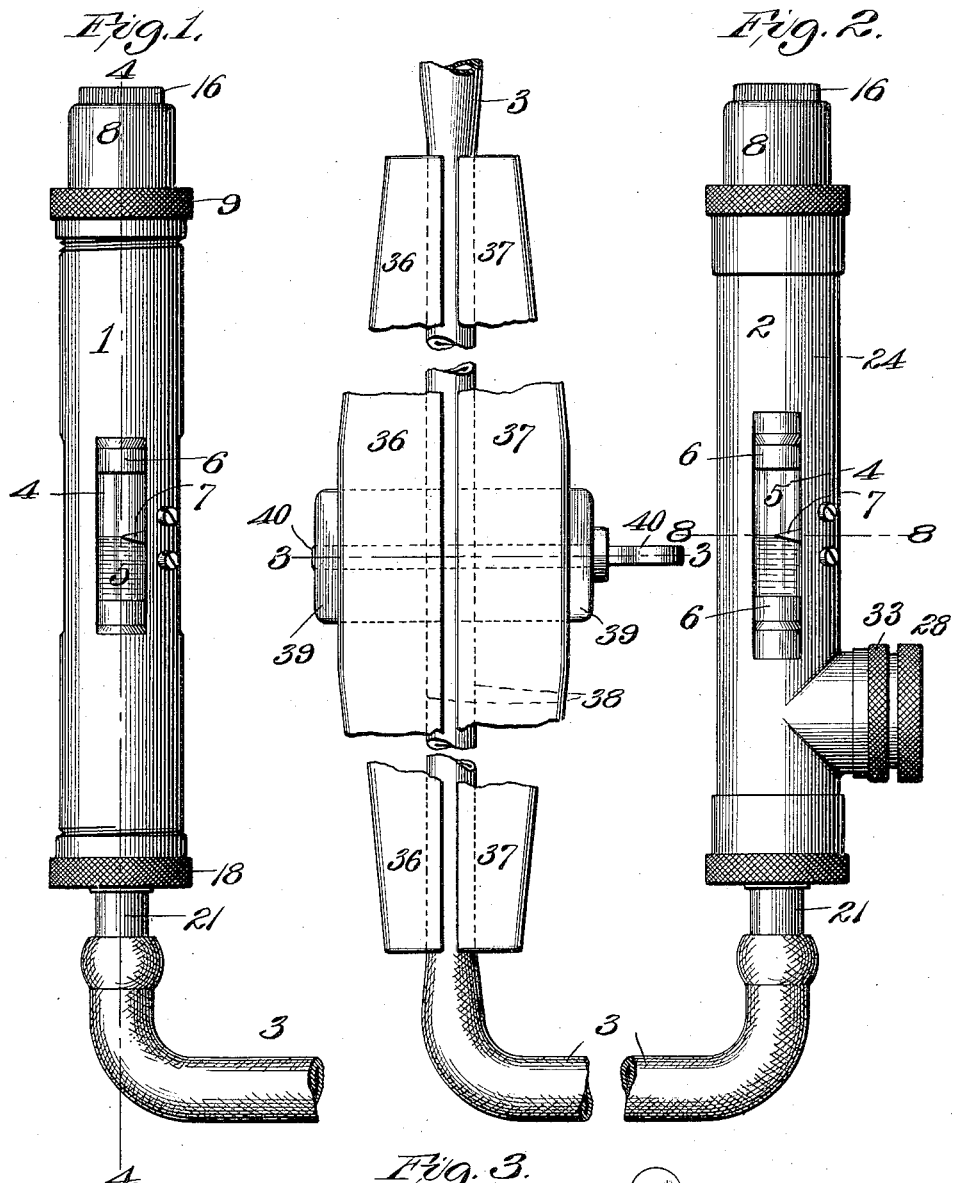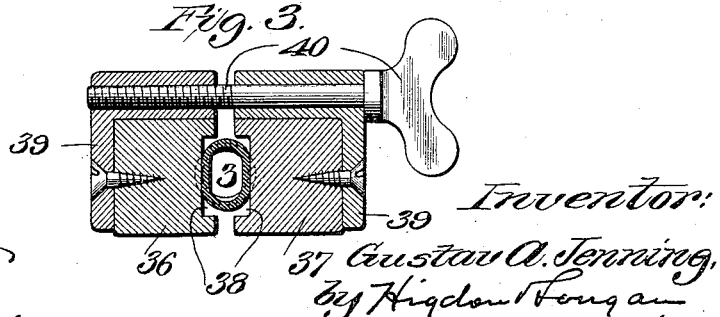

UNITED STATES PATENT OFFICE.

GUSTAV A. JENNING, OF EAST ST. LOUIS, ILLINOIS.

LEVELING INSTRUMENT.

1,060,602.  Specification of Letters Patent.  Patented May 6, 1913.

Application filed July 19, 1911.  Serial No. 639,438.

*To all whom it may concern:*

Be it known that I, GUSTAV A. JENNING, a citizen of the United States, and resident of East St. Louis, Illinois, have invented certain new and useful Improvements in Leveling Instruments, of which the following is a specification containing a full, clear, and exact description, reference being had to the accompanying drawings, forming a part hereof.

My invention relates to an improved leveling instrument, and consists of the novel construction hereinafter described and pointed out in the claims appended to this specification.

The object of my invention is to improve and simplify the construction shown in my prior patent for leveling instrument issued to me November 26, 1907, No. 872,183.

The invention belongs and appertains to the class of portable leveling instruments whereby levels may be obtained at considerable distances apart without the use of an engineer's transit or leveling instrument, there being two separate instruments of special construction connected by a flexible tube for obtaining an uninterrupted fluid connection between said two levels and for the purpose hereinafter more fully set forth.

In the drawings: Figure 1 is an elevation of one of my improved leveling tubes; Fig. 2 is an elevation of the other leveling tube and a hose squeezing device; Fig. 3 is a transverse section of the hose squeezing device taken on the line 3—3 of Fig. 2; Fig. 4 is a vertical section taken on the line 4—4 of Fig. 1; Fig. 5 is a vertical section taken through the center of the leveling tube, which is shown at the right hand of Fig. 2; Fig. 6 is a vertical section of a filling attachment; Fig. 7 is a vertical section of an air-vent; Fig. 8 is a horizontal section taken on the line 8—8 of Fig. 2; Fig. 9 is an elevation of the inner end of a volute pointer adjusting device detached from the instrument.

The natural law that liquid will always seek its level is employed in my improved instrument.

The two separate instruments are indicated by the numerals 1 and 2, and in use they are connected by means of a flexible tube 3, which may be of any desired length for use in surveying operations, such as making excavations, mining, submarine work and the like, and the instruments being light and portable can be readily carried over walls or like constructions in a building, or through passageways of mines or excavations to the point where it is desired to ascertain the desired level.

The instrument 1, which is positioned at the known or fixed elevation, comprises the usual exterior tube in which is formed the plurality of vertically disposed sight openings 4, and vertically disposed within said tube opposite these sight openings is a transparent tube 5 held at its ends by collars 6, which are fixed in any suitable manner within the outer tube. Fixed on one of the ribs of the outer tube, between the sight openings 4 is a pointer 7, the free end of which terminates adjacent the surface of the transparent tube, at a point approximately midway between its ends.

The outer end of the outer tube of the instrument 1 is screw-threaded, and upon said screw-threaded upper end is detachably mounted a double water trap 8, which is held in place by the internally threaded thimble 9 engaging a flange 10 at the lower end of the said trap to forcibly compress the packing ring 11 between the upper end of said outer tube and the body of the said water trap. The purpose of said double trap is to prevent the liquid contained in the tubes from being spilled and lost when the instrument is accidentally inverted. The trap 8 is provided in its upper end with a vent opening 12, from which depends a short tube 13. Said trap 8 is also provided at the lower end of its body with an opening 14 from the wall of which depends another tube 15. The tube 13 performs the double function of a water trap and continuously open air-vent within the trap body 8, and the tube 15 performs the double function of a trap and permanently open air vent within the upper end of the body of the instrument 1.

Fixed to the rear side of the instrument 1 and extending upwardly therefrom is a finger 16 and fixed to the lower portion of the said instrument, and projecting rearwardly therefrom is another finger 17 the outer end of which is in vertical alinement with the rear side of said finger 16. (See Fig. 4.)

The lower end of the instrument 1 is screw threaded exteriorly to receive the screw threaded clamping ring 18, the flange 19 of which engages the flange 20 of the tubular plug 21. This tubular plug carries at its upper end within the lower portion of said instrument a collapsible sack 22. The said collapsible sack occupies the chamber in the lower end of the instrument 1 beneath the transparent tube 5. Fixed to the upper end of the tubular plug 21, and within the collapsible sack 22 and over the passageway through the said plug is a screen 23, which serves as a guard to prevent the collapsible sack from being drawn into the passageway through the plug. One end of the flexible tube 3 is removably secured upon the lower end of the said tubular plug 21.

The construction of the other leveling instrument at the opposite end of the flexible tube 3, (and shown at the right hand of Figs. 2 and 5) is identical with the instrument 1, except in several particulars presently described. On account of the similarity of the two instruments 1 and 2, a further description of the construction of the upper and lower ends of said instrument 2 is therefore unnecessary.

The principal difference between the instruments 1 and 2 is the fact that the instrument 2 has a construction for vertically adjusting its pointer 7, and for this purpose the pointer is mounted upon an exterior tube 24 which is telescopically mounted upon the main tube 25 of the instrument 2. The exterior tube 24 is arranged to slide freely upon the main tube 25, and is also provided with sight openings to correspond with the sight openings 4 of the said main tube. Fixed to one of the ribs between the sight openings of the said exterior tube 24 is an additional indicator pointer 7 identical in construction with the indicator pointer previously described as applied to instrument 1, the free end of which pointer terminates adjacent the surface of the transparent tube of the instrument 2, and said pointer slides in a slot 26 formed in the corresponding one of the ribs between the sight openings. (See Fig. 8.)

For use in sliding the exterior tube to accurately adjust the pointer 7 of the instrument 2, I provide the exterior tube 24 with a volute cam device, which I will now proceed to describe in detail.

27 indicates a strip of metal arranged in the form of a volute cam and fixed upon the inner end of a revoluble handle 28 so that the said volute cam strip will engage in a slot 29 of a lug 30 fixed upon the main tube 25, said lug sliding in the vertical slot 31 formed in the exterior tube 24. (See Fig. 5). 32 indicates a cylindrical bearing in which the inner portion of the said cam handle 28 is rotatably mounted. Said handle 28 is retained in its bearing 32 by a flange ring 33, which is a split ring of common form, and is threaded upon the outer end of said bearing, and which has a flange 34 engaging a corresponding annular groove 35 formed in said handle. The said ring 33 is first "split"; it is then placed in position, and subsequently the ends of the ring are united by solder; thus making a practically continuous ring, as shown. It is understood, of course, that such work can be done by an ordinary workman. By means of this construction the pointer 7 of the instrument 2 may be accurately adjusted by rotating the said handle 28 in the desired direction to raise and lower the exterior tube 24, which carries said pointer. The handle 28 may be detached from the instrument 2 by unscrewing the flanged ring 33.

For the purpose of regulating the height of the fluid columns in the tubes during operation, and also for compensating for any leakage, or expansion and contraction of the fluid, I provide a hose squeezing device, the details of which are more clearly shown in Figs. 2 and 3, and which I describe as follows: 36 and 37 indicate opposite clamping-jaws preferably made of wood for the sake of lightness, and having a length approximating twelve inches, and formed with opposite grooves 38 in their opposing faces for receiving the hose 3, and also to retain the clamp in position thereon. The clamping jaws are forcibly urged together by means of a two part clamp 39, which is connected by a thumb screw 40, so that when said thumb screw is turned in one direction the hose will be squeezed between said jaws, and when said thumb screw is turned in an opposite direction the hose will be correspondingly relieved.

For use in filling the flexible tube 3 and the collapsible sacks of the instruments 1 and 2, I make use of a filling attachment, which I will now proceed to describe in detail.

Located in the flexible tube 3 at a point approximately one foot from each of the instruments 1 and 2 is a combined air-vent and filling valve 41. (See Fig. 7.) The body of said valve 41 is provided with integral globular heads 42 over which the end of the hose is slipped, and projecting upwardly from said body is a neck 43, the upper end of which is webbed with a series of apertures 44. Threaded upon the free upper end of the said neck 43 is a cap 45 having a central perforation 46. During the filling operation the collapsible sacks 22 are first removed from both of the instruments 1 and 2, and then said collapsible sacks are each placed within the individual protector 47 which has exterior dimensions the same as those of the collapsible sack receptacles of the instruments 1 and 2, said individual protector 47 also having a glass plate 48 which forms a transparent upper end for said protector, through which the operator can see the air bubbles should there possibly be any air left in the flexible tube 3. The lower end of the protector 47 is screw threaded and provided with a construction identical with that of the lower end of the instrument 1 so that the flexible sack may be readily removed when desired by detaching the flange ring 20 from the lower end of the said protector.

The operation is as follows: In filling the tube 3, a common funnel is connected to one of the valves 41 by a short length of tubing fitting tightly on both. The valves are opened by unscrewing the cap a turn or two. The fluid then passes into the one and the air out of the other. The protector 47 is then placed over the collapsible sack to prevent it from bursting due to the pressure from the funnel. The transparent end 48, is made use of to detect air bubbles in the collapsible sack, the latter being also transparent. After that end of the flexible tube 3, to which the funnel is attached, is filled, the rest of the tube is then moved slowly from left to right over a common peg or hook (not shown) which is placed in the wall at a point higher than the funnel to prevent the fluid from running into the coils below which would prevent the free escape of the air. After the entire tube has been filled up to the valve at the left, the fluid will pass into the collapsible sack on the extreme end, the air escaping due to the way it is suspended. When the tube and both sacks are full both of the valve caps 45 are closed and the funnel, as well as the protectors 47, are detached, and the ends of the tube 3 carrying the sacks are attached to the instruments 1 and 2, when the device will be ready for use. Surplus fluid, due to overfilling, can be allowed to escape by opening one of the valve-caps 45. It will thus be seen that the flexible tube 3 and the collapsible sacks are completely filled with a suitable fluid, such as water or diluted alcohol, and that the transparent tubes 5 are partially filled with fluid. When the tubes of the instruments 1 and 2 are at approximately the same level as shown, the fluid is discernible through the said transparent tubes 5, and the water level in each of the transparent tubes coincides with the pointer 7. To ascertain a point in a vertical plane after a fixed point has been established, the instrument 1 is vertically disposed with the upper end of the finger 16 at the known or given point, and the operator now takes the other instrument 2 and the parts carried thereby and carries the same to the location where it is desired to establish a point in the same horizontal plane with a point occupied by the upper end of the finger 16, and said instrument 2 is then shifted vertically until the fluid is discernible through the sight openings of the transparent tube 5 of said instrument 2; and to bring the upper end of the finger 16 of said instrument 2 to the exact point or in perfect horizontal alinement with the corresponding finger of the instrument 1, the operator holding the instrument 2 manipulates the handle 28 of the strument 2 so as to elevate or lower the volute cam 27 carrying its pointer 7, to exterior tube 24 carrying its pointer 7, to bring said pointer in horizontal alinement with the level of the fluid in the transparent tube 5 of said instrument 2; and when this has been accomplished the upper end of the finger 16 of the instrument 2 marks the desired point which is in exact horizontal alinement with the upper end of the finger 16 of the instrument 1. The fluid in the flexible tube 3 will freely flow in either direction, correspondingly filling or collapsing the collapsible sacks 22, and the movement of said sacks correspondingly changes the level of the bodies of fluid within the transparent tubes 5 of the instruments 1 and 2. As the fluid rises and falls in the said transparent tubes 5, the air in the chambers above said transparent tubes is ejected or drawn into the trap-tubes 13 and 15.

What I claim is:

1. The improved leveling-instrument, comprising a pair of tubes, transparent-tubes arranged within the first mentioned tubes, collapsible-sacks arranged in the lower ends of said first mentioned tubes in the spaces below said transparent-tubes, a flexible-tube connecting the said collapsible sacks and adapted to be filled with fluid, the space above said collapsible sacks being adapted to be partially filled with fluid, and a combined fluid-trap and continuously open air-vent at the upper end of each of said first mentioned tubes.

2. The improved leveling-instrument, comprising a pair of tubes, transparent-tubes arranged within the first mentioned tubes, collapsible-sacks arranged in the lower ends of said first mentioned tubes in the spaces below said transparent-tubes, a flexible-tube connecting the said collapsible-sacks and adapted to be filled with fluid, the spaces above said collapsible-sacks being adapted to be partially filled with fluid, a combined fluid-trap and air-vent at the upper end of each of said first mentioned tubes, and a second combined fluid-trap and air-vent located above said first mentioned combined fluid-trap and air-vent and in communication with the interior thereof.

3. The improved leveling-instrument, comprising a pair of tubes, transparent-tubes arranged within the first mentioned tubes, collapsible-sacks arranged in the lower ends of said first mentioned tubes in the spaces below said transparent-tubes, a flexible-tube connecting the said collapsible-sacks and adapted to be filled with fluid the space above said collapsible-sacks being adapted to be partially filled with fluid, a combined fluid-trap and air-vent at the upper end of each of said first mentioned tubes, a pointer for each of said transparent-tubes, and a volute-cam for adjusting one of said pointers.

4. The improved leveling-instrument, comprising a pair of tubes, transparent-tubes arranged within the first mentioned tubes, collapsible-sacks arranged in the lower ends of said first mentioned tubes in the spaces below said transparent-tubes, a flexible-tube connecting the said collapsible-sacks and adapted to be filled with fluid, a combined fluid-trap and continuously open tubular air-vent at the upper end of each of said first mentioned tubes, and a clamp for squeezing said flexible-tube.

5. In combination with two liquid-containing leveling devices, a flexible tube, connected to each of said devices, and a separate portable hose-squeezing clamp having opposite retaining grooves in its clamping jaws for holding said clamp upon said hose and for squeezing said tube.

6. In combination with a pair of leveling-devices connected by a flexible hose, a separate portable clamp for squeezing the same, comprising opposite clamping-jaws having longitudinal retaining grooves in their opposite faces for holding the clamp in position on said hose, and a two part thumb-screw clamping-device embracing the jaws.

7. In a leveling-instrument a protector casing separate from the leveling instrument casings used in filling the collapsible sacks of the leveling instruments; the same comprising, a casing having dimensions the same as those of the collapsible-sack receptacles of the leveling instruments, a hose-connection detachably connected to the lower end of said protector casing, and a flat transparent plate in the upper end of said casing.

In testimony whereof, I have signed my name to this specification, in presence of two subscribing witnesses.

GUSTAV A. JENNING.

Witnesses:
E. L. WALLACE,
JOHN C. HIGDON.

---

Copies of this patent may be obtained for five cents each, by addressing the "Commissioner of Patents, Washington, D. C."